United States Patent [19]

Byrne

[11] Patent Number: 4,489,997
[45] Date of Patent: Dec. 25, 1984

[54] ELECTRICAL CONNECTOR

[75] Inventor: Norman R. Byrne, Ada, Mich.

[73] Assignee: Stow & Davis Furniture Company, Grand Rapids, Mich.

[21] Appl. No.: 358,092

[22] Filed: Mar. 15, 1982

[51] Int. Cl.³ .................. H01R 15/00; H01R 4/66
[52] U.S. Cl. .................. 339/13; 339/14 R; 339/22 R; 339/24; 339/275 R
[58] Field of Search .............. 339/13, 14 R, 14 L, 339/15, 16 R, 94 A, 102 R, 218 R, 218 M, 22 R, 24, 275 R; 264/272.11, 272.14; 174/78; 285/21, 284

[56] References Cited

U.S. PATENT DOCUMENTS

| 2,506,979 | 5/1950 | Varnum | 173/363 |
|---|---|---|---|
| 2,755,449 | 7/1956 | Anderson | 339/47 |
| 3,322,885 | 5/1967 | May et al. | 174/78 |
| 3,370,122 | 5/1964 | Ichikawa | 339/13 X |
| 3,488,073 | 1/1970 | Wold | 285/388 |
| 3,546,365 | 12/1970 | Collier | 174/78 |
| 3,593,002 | 7/1971 | Hebert | 339/275 R |
| 3,801,729 | 4/1974 | Portinari et al. | 174/106 R |
| 3,895,177 | 7/1975 | Muslin | 174/48 |
| 4,135,775 | 1/1979 | Driscoll | 339/22 R |
| 4,162,370 | 7/1979 | Dunn et al. | 339/15 X |
| 4,205,888 | 6/1980 | Wade | 339/14 R |
| 4,224,463 | 9/1980 | Koerber et al. | 174/47 |
| 4,270,020 | 5/1981 | Kenworthy et al. | 174/48 |

FOREIGN PATENT DOCUMENTS

| 667526 | 11/1965 | Belgium | 339/14 R |
|---|---|---|---|
| 1113980 | 12/1981 | Canada | 339/15 |
| 577774 | 5/1946 | United Kingdom | 339/14 L |

Primary Examiner—Eugene F. Desmond
Assistant Examiner—Steven C. Bishop
Attorney, Agent, or Firm—Price, Heneveld, Huizenga & Cooper

[57] ABSTRACT

The specification discloses an electrical connector assembly comprising a flexible metal conduit and a plastic housing molded directly onto the conduit. The housing defines a chamber in which are positioned a plurality of terminal clips, all of which are connected to wires extending into the conduit. A ground wire extends through the housing and includes a first end connected to one of the terminal clips, designated the grounding clip, and a second end secured to the conduit to ground the connector assembly.

24 Claims, 7 Drawing Figures

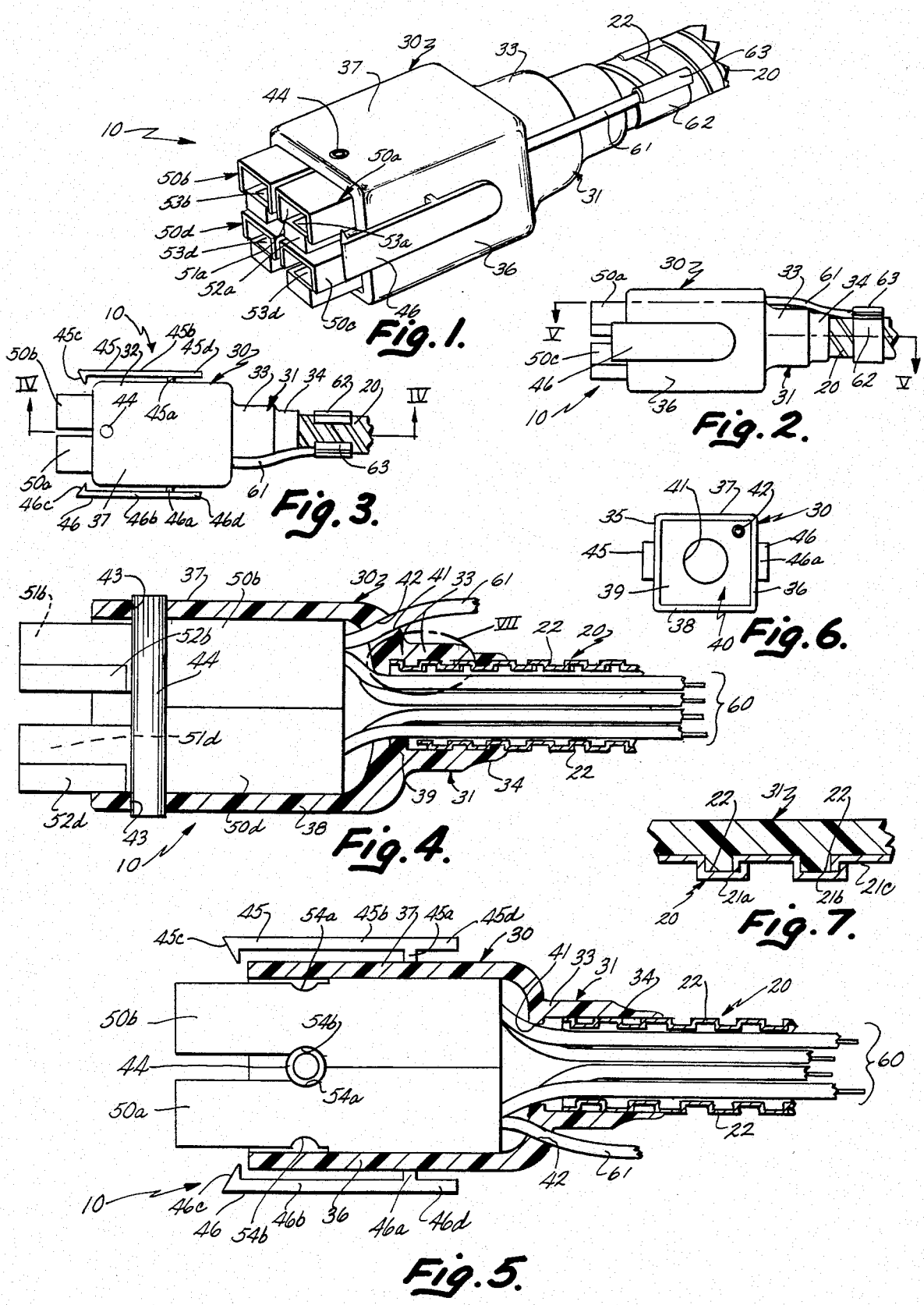

ELECTRICAL CONNECTOR

BACKGROUND OF THE INVENTION

The present invention relates to electrical connectors, and more particularly to electrical connectors for protective conduit.

Modular electrical wiring systems have been developed to facilitate the electrical wiring of office landscaping systems. Typically, the modular electrical components include means for conveying current throughout the landscaping system, such as to lighting fixtures and plug receptacles, from a common power source. The landscaping system may be rapidly and readily wired in any one of a multitude of configurations, depending on how the modular electrical components are interconnected.

Typically, the modular electrical components include conduit segments, each comprising a flexible conduit having a connector housing at either end thereof. A plurality of wires are positioned within the conduit and connected at either end to terminal clips positioned within the opposite connector housings. When one of the connector housings is coupled to a mating electrical component, all of the terminal clips within the housing are connected to the mating component, and consequently, to wires within the conduit.

One well-known helical conduit connector housing is that made by Anderson Power Products of Worcester, Mass. This connector includes a clamping portion to which is secured a clamping member to entrap the conduit therebetween to secure the connector to the conduit. Examples of these connectors in landscaping systems are shown in U.S. Pat. No. 4,270,020, entitled PARTITION WIRING SYSTEM, issued May 26, 1981, to Kenworthy et al; and U.S. Pat. No. 4,135,775, entitled MOVABLE DIVIDER PANELS WITH ELECTRICAL WIRING, issued Jan. 23, 1979 to Driscoll. However, these connectors are time-consuming to install on the conduit because each of the connectors must be individually assembled by securing the clamping member and associated screws to the connector, and then each connector must be secured to the conduit. This assembly is labor-intensive, and results in conduit segments which are relatively expensive. Second, the clamps may become loosened during use or installation, such that the connector might become unattached from the conduit, exposing an uninsulated wire. Third, the clamping connection is relatively large and somewhat unsightly, rendering the connector excessively large to fit within some landscaping systems.

The conduit segments often include a ground terminal clip within the connector housing and electrically connected to the metal conduit to provide a system ground. The connector manufactured by Anderson Power Products includes a terminal clip and a ground wire extending from the terminal clip and fastened to the metal conduit under the clamping member used to secure the housing to the conduit. However, this construction is quite bulky and unsightly. Second, the mechanical connection is relatively large, rendering this connector unsuitable for many installations requiring relatively small connectors.

Another grounded connector includes a coil spring secured about the metal conduit and positioned under the housing secured to the conduit. The spring includes a portion extending into the connector housing which may be connected to a ground wire. An example of such a grounded connector may be seen in U.S. Pat. No. 4,205,888, entitled GROUND CONNECTOR FOR INTERLOCKED ARMOR ELECTRICAL CABLE, and issued June 3, 1980, to Wade. However, this connector requires a coil spring, which is a relatively expensive element excessively increasing the cost of the connector. Second, assembly of the connector is difficult because the spring must be wound about the conduit, such that the spring follows the helical groove on the conduit, prior to installing the housing.

Another wiring segment, manufactured by Amp Electric of Harrisburg, Pa., includes several insulated wires and a plug integrally molded onto the wire insulation. However, this wiring segment does not include protective conduit which should preferably be included to improve the strength and safety of the wiring segments. Second, these wiring segments cannot be used in many states where the electrical code requires conduit. This renders the wire segments virtually useless to a national manufacturer who must satisfy all state electrical codes. Third, these segments are difficult to properly ground because of the absence of a metal conduit.

SUMMARY OF THE INVENTION

The aforementioned problems are solved by the present invention. Essentially, an electrical connector assembly is provided comprising a protective conduit, having an uneven surface, and a connector housing molded onto the conduit. Consequently, the connector housing which closely interfits with the uneven outer surface of the conduit cannot be readily removed from the conduit once installed. Second, the need for a clamping structure to secure the housing to the conduit is eliminated, reducing the size and cost of the connector assembly.

In another aspect of the invention, the electrical connector assembly includes a conduit, a connector housing secured to the conduit, and a grounding means extending through the housing and connected to the conduit beyond the housing. More particularly, the housing defines a terminal clip chamber, and the grounding means includes a first end, positioned within the chamber, to be connected to a ground and a second end fastened with a spring clip to the metal conduit. Assembly is facilitated because the ground does not have to be carefully clamped under a connector clamping member or coiled about the helical conduit.

These and other objects, advantages, and features of the invention will be more fully understood and appreciated by reference to the written specification and appended drawings.

BRIEF DESCRIPTION OF THE DRAWINGS

FIG. 1 is a perspective view of an electrical connector assembly of the present invention with the conduit broken off;

FIG. 2 is a side elevational view of the assembly;

FIG. 3 is a top plan view of the assembly;

FIG. 4 is a sectional view taken along plane IV—IV in FIG. 3;

FIG. 5 is a sectional view taken along plane V—V in FIG. 2;

FIG. 6 is an end view of the housing with the terminal clips and wires removed; and FIG. 7 is an enlarged view of the area within line VII in FIG. 4.

DESCRIPTION OF THE PREFERRED EMBODIMENT

An electrical connector assembly in accordance with a preferred embodiment of the invention is illustrated in the drawings and generally designated 10. As seen in FIGS. 1 and 5, assembly 10 generally includes conduit 20, housing 30 molded onto the conduit, terminal clips 50 positioned within the housing, and wiring 60 connected to the terminal clips. Housing 30 includes a throat portion 31 molded directly to conduit 20 to positively secure the housing to the conduit. Grounded terminal 50a is electrically connected to a ground wire 61 which extends through housing 30 and is clipped to conduit 20 using spring clip 62.

Conduit 20 (FIGS. 1, 2 and 7) is generally well known to those having ordinary skill in the art. Suffice it to say that conduit 20 is a metal, helical conduit used to protectively encase electrical wires, such as 60. Typically, conduit 20 is fabricated from a helical strip wound upon itself to form sequential interlocking turns 21a, b, and c, as seen in FIG. 7. Spiral or helical groove 22 is defined by turns 21. Consequently, the outer surface of conduit 20 is rough and recessed due to the presence of spiral groove 22 along its entire surface.

Housing 30 (FIGS. 1, 2, 3, and 6) is a unitary member, preferably fabricated of a plastic material, and includes body 32 and an integral, reduced throat 31. As previously mentioned, throat 31 is molded directly onto cable 20 so that portions of throat 31 extend into helical groove 22 (FIGS. 4, 5, and 7). Therefore, throat 31, and consequently housing 30, are securely and positively retained on conduit 20. Throat 31 comprises collar portion 33 extending from body 32 and tail portion 34 extending from collar portion 33 opposite body 32. The outer diameter of tail portion 34 is smaller than the outer diameter of collar portion 33. Body 32 includes generally parallel sidewalls 35 and 36, interconnected by generally parallel top and bottom walls 37 and 38. A generally planar rear wall 39 interconnects walls 35, 36, 37, and 38 to define chamber 40 (see FIG. 6). Rear wall 39 further defines wire aperture 41 (FIGS. 4, 5, and 6) through which wires 60 extend between chamber 40 and conduit 20. Additionally, wall 39 defines ground wire aperture 42 located proximate collar 33 of throat 31. Top and bottom walls 37 and 38 define a pair of generally aligned pin apertures 43 (FIG. 4). Pin 44 extends through chamber 40 and is positioned within apertures 43 for holding the terminal clips 50 in the housing or chamber 40.

Jaws 45 and 46 (FIGS. 1, 2, 3, and 5) extend from sidewalls 35 and 36, respectively. Jaw 46 includes a pivot stud 46a, and an arm 46b integrally connected thereto. Arm 46b includes barb 46c at its forward end and a rearward portion 46d at its rearward end. Jaw 45 similarly includes stud 45a, arm 45b, barb 45c and rearward portion 45d. Jaws 45 and 46 are shown in their normal at-rest positions, wherein arms 45b and 46b are generally parallel to sides 35 and 36, respectively. When housing 30 is forced into an appropriate electrical connector, barbs 45c and 46c lockingly engage a portion of the other connector. When housing 30 is to be removed from the other connector, rear portions 45d and 46d of the jaws are pinched toward one another so that barbs 45c and 46c flex outwardly about pivot studs 45a and 46a to disengage the other connector so that housing 30 may be removed from the other connector.

Terminal clips 50 (FIGS. 1, 4, and 5) in the preferred embodiment are commercially available and offered for sale by Anderson Power Products as part Nos. 261-G1, 19601-G2, 19601-G12, 19601-G-15, and 19601-G-16. Each of clips 50 is generally identical to the others and includes rectangular socket 51, integral plastic spring arm 52, and conductive lead 53 mounted on the spring arm. All of terminal clips 50a, b, c, and d are connected to one of wires 60 leading through conduit 20. Additionally, ground clip 50a is connected to ground wire 61. Lead 53a is electrically connected to wire 61 in a well-known manner. All of leads 53 of terminal clips 50 are connected to one of wires 60 also in a well-known manner. As best seen in FIGS. 1, 2, and 3, clips 50 compactly fit within chamber 40 in housing 30. Each of clips 50 defines a pair of opposed arcuate surfaces 54a and b (FIG. 5), one of which interfits with pin 44 to retain clips 50 within housing 30.

Ground wire 61 (FIGS. 4 and 5) extends through housing 30, and more particularly through aperture 42 in rear wall 39 and lies closely proximate throat 31. Ground wire 61 is connected at one end to terminal clip 50a within housing 30 and at its other end to spring clip 62 (see FIGS. 1, 2, and 3). Spring clip 62 includes end portion 63 bent back upon the clip to pinchingly secure wire 61 therebetween. Spring clip 62 is snapped onto conduit 20 to provide an electrical contact between lead 53a on terminal clip 50a and conduit 20 to ground connector assembly 10.

ASSEMBLY AND OPERATION

Assembly 10 is constructed by first injection molding housing 30 directly onto conduit 20. All of the elements comprising housing 30 are formed on one injection. Throat 31 is molded about conduit 20, particularly extending into helical groove 22 (see FIGS. 4, 5, and 7). Ground wire aperture 42 is then formed or drilled in rear wall 39 immediately proximate collar portion 33 of throat 31. Each of wires 60 is then connected to one clip 50, and wire 61 is further connected to clip 50a. The clips are positioned within housing 30 with wire 61 extending through ground wire aperture 42 and with wires 60 extending through wire aperture 41 and into conduit 20. Pin 44 is then inserted through apertures 43 and within slots 54 in clips 50 to secure clips 50 within housing 30. Finally, spring clip 62 is clipped onto conduit 20 proximate housing 30 and wire 61 is pinchingly secured between free end 63 and the remainder of clip 62.

An assembly (not shown) is then formed on the opposite end of conduit 20 to provide a conduit segment having appropriate connectors at either end. Preferably, each of clips 50 within housing 30 is uniquely colored to facilitate proper electrical connections between connector assembly 10 and other electrical components.

The conduit segments having electrical connector assemblies 10 thereon are then ready for use in a modular wiring system. The conduit segments may be connected to other electrical devices to provide circuitry within a structure, such an office landscaping system. The fact that the wires 60 are contained within a protective conduit 20 improves the safety and strength of the resulting wiring system. Second, the streamlined and compact shape of housing 30, provided by directly molding housing onto conduit 20, enables connector assembly 10 to be installed in spaces previously too small for known connectors. Third, the direct molding of housing 30 onto conduit 20 provides a positive connection between these two elements in part because the exterior surface of conduit 20 is uneven. Consequently, housing 30 may not be pulled off of conduit 20 without breaking some portion of the housing.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A grounded electrical connector assembly comprising:
   a conductive conduit having an open end;
   a connector housing molded onto said conduit, said housing defining a chamber communicating with said conduit;
   grounding means extending through said housing, said grounding means including a first end within said chamber and a second end outside of said chamber; and
   means for electrically connecting said second grounding means end to said conduit.

2. A grounded electrical connector assembly as defined in claim 1 wherein said electrical connecting means comprises a spring clip clipped to said conduit.

3. A grounded electrical connector assembly as defined in claim 2 wherein said spring clip comprises means for pinchingly securing said second grounding means end.

4. A grounded electrical connector assembly as defined in claim 1 wherein said conduit comprises flexible conduit.

5. A grounded electrical connector assembly as defined in claim 4 wherein said conduit is a helical conduit.

6. A grounded electrical connector assembly as defined in claim 1 further comprising:
   a plurality of terminal clips positioned within said clip chamber, said first grounding means end being electrically connected to one of said terminal clips; and
   a plurality of conductor means each electrically connected to one of said terminal clips and extending into said conduit through said open end.

7. A grounded electrical connector assembly as defined in claim 1 further comprising means on said housing for securing said housing to another electrical component.

8. A grounded electrical connector assembly as defined in claim 1 wherein said housing comprises:
   a body portion defining said chamber; and
   an integral throat portion extending from said body portion over said conduit.

9. A grounded electrical connector assembly as defined in claim 8 wherein said grounding means extends through said body portion of said housing and lies proximate said throat portion of said body.

10. A grounded electrical connector assembly comprising:
    a conductive conduit having an uneven outer surface and an open end;
    a nonconductive housing molded onto said conductive conduit, said nonconductive housing having a chamber communicating with said open end;
    electrical conductor means extending through said nonconductive housing, said conductor means having a first end including ground contact means positioned within said chamber and a second end positioned outside of said chamber and outside of said conduit; and
    means for electrically connecting said second conductor means end to the outside of said conductive conduit, whereby said conductor means is grounded to said conduit.

11. A grounded electrical connector assembly as defined in claim 10 wherein said electrical connecting means comprises a spring clip clipped to said conduit.

12. A grounded electrical connector assembly as defined in claim 11 wherein said spring clip comprises means for pinchingly securing said second grounding means end.

13. A grounded electrical connector assembly as defined in claim 10 wherein said conduit comprises flexible conduit.

14. A grounded electrical connector assembly as defined in claim 13 wherein said flexible conduit comprises helical conduit.

15. A grounded electrical connector assembly as defined in claim 10 further comprising:
    a plurality of terminal clips positioned within said clip chamber, said ground contact means being one of said terminal clips; and
    a plurality of second conductor means each electrically connected to one of the others of said terminal clips and extending into said conduit through said open end.

16. A grounded electrical connector assembly comprising:
    a conductive conduit having an open end;
    a housing secured to said conduit, said housing having a chamber communicating with said open end, said housing including a body portion defining said chamber and a throat portion molded onto said conduit, said throat portion being integral with said body portion;
    electrical conductor means extending through said body portion of said housing and lying proximate said throat portion, said conductor means having a first end positioned within said chamber and a second end positioned outside of said chamber; and
    means for electrically connecting said second conductor means end to a portion of said conduit, whereby said conductor means is grounded to said conduit.

17. An electrical connection assembly comprising:
    a protective conductive helical conduit having an open end;
    a plurality of linear electrical conductors oriented axially within said helical conduit and extending through said open end, each of said conductors terminating in a connector means;
    a molded connector housing including a body portion defining a connector chamber communicating with said conduit open end and defining an open mouth opposite said open end, said conductor connector means being located within said connector chamber and readily accessible proximate said chamber mouth, said housing further including a throat portion integral with said body portion, said throat portion being molded directly onto said conduit; and ground means extending through said housing and including a first end within said chamber and a second end outside of said chamber, said second end being grounded to said conductive conduit.

18. An electrical connector assembly as defined in claim 17 further comprising means on said housing for securing said housing to another electrical component.

19. An electrical connection assembly as defined in claim 17 wherein said throat portion is reduced in size from said body portion.

20. An electrical connection assembly comprising:

a conductive conduit for protectively encasing electrical conductor means, said conduit having an open end and an uneven outer surface;

a plurality of conductor means extending axially through said conduit and said open end and each terminating in a connector portion;

a connector housing defining a connector chamber having a chamber mouth opposite said conduit open end, said connector portions being located within said chamber for ready access proximate said chamber mouth, said housing being molded onto said uneven outer surface with said open conduit end communicating with said chamber, whereby said housing is positively secured to said conduit end; and ground means extending through said housing and including a first end within said chamber and a second end outside of said chamber, said second end being grounded to said conductive conduit.

21. An electrical connection assembly as defined in claim 20 wherein said conduit comprises flexible conduit.

22. An electrical connection assembly as defined in claim 21 wherein said conduit comprises helical conduit.

23. An electrical connector assembly as defined in claim 20 further comprising means on said housing for securing said housing to another electrical component.

24. An electrical connection assembly as defined in claim 20 wherein said housing comprises:

a body portion defining said connector chamber; and a reduced throat portion integral with and extending from said body portion over said conduit.

* * * * *